(12) United States Patent
Green

(10) Patent No.: US 9,876,375 B2
(45) Date of Patent: *Jan. 23, 2018

(54) JUMPER CABLE

(71) Applicant: Jesse Green, DeSoto, TX (US)

(72) Inventor: Jesse Green, DeSoto, TX (US)

(*) Notice: Subject to any disclaimer, the term of this patent is extended or adjusted under 35 U.S.C. 154(b) by 0 days.

This patent is subject to a terminal disclaimer.

(21) Appl. No.: 15/488,060

(22) Filed: Apr. 14, 2017

(65) Prior Publication Data

US 2017/0222462 A1    Aug. 3, 2017

Related U.S. Application Data

(63) Continuation-in-part of application No. 13/875,472, filed on May 2, 2013, now Pat. No. 9,627,905.

(60) Provisional application No. 61/642,546, filed on May 4, 2012.

(51) Int. Cl.
| | |
|---|---|
| *H02J 7/00* | (2006.01) |
| *H01R 11/28* | (2006.01) |
| *H01R 24/58* | (2011.01) |
| *H01R 103/00* | (2006.01) |
| *H01R 13/453* | (2006.01) |
| *H01R 13/625* | (2006.01) |
| *H01R 13/642* | (2006.01) |
| *H01R 31/06* | (2006.01) |

(52) U.S. Cl.
CPC ......... *H02J 7/0054* (2013.01); *H01R 11/288* (2013.01); *H01R 24/58* (2013.01); *H01R 13/4538* (2013.01); *H01R 13/625* (2013.01); *H01R 13/642* (2013.01); *H01R 31/065* (2013.01); *H01R 2103/00* (2013.01)

(58) Field of Classification Search
CPC ....................................... H02J 7/0034
USPC ......................................... 320/105
See application file for complete search history.

(56) References Cited

U.S. PATENT DOCUMENTS

| | | | | |
|---|---|---|---|---|
| 5,083,076 A | * | 1/1992 | Scott | H01M 10/46 |
| | | | | 320/105 |
| 6,756,764 B2 | * | 6/2004 | Smith | F02N 11/14 |
| | | | | 320/105 |
| 6,759,833 B1 | * | 7/2004 | Chen | H01M 2/342 |
| | | | | 320/105 |

(Continued)

*Primary Examiner* — Yalkew Fantu
(74) *Attorney, Agent, or Firm* — Vincent J. Allen; J. Andrew Reed; Carstens & Cahoon, LLP

(57) ABSTRACT

A jumper cable which includes a receptacle mounted on, near or within a battery casing. The receptacle may include a socket having a pair of circular contacts on the inner circumference thereof electrically connected to battery terminals. The device may also include a cable having a plug on each end configured to mate with the receptacle socket. Such a plug may include a larger-diameter ring for engaging the upper contact and a smaller-diameter ring for engaging the lower contact when the plug is inserted into the socket. Accordingly, if a battery needs recharging, a plug is inserted into the receptacle associated with the dead battery and the opposing plug is inserted into a receptacle associated with a charged battery to establish electrical interconnection there between. Alternatively, an adapter having a socket and electrical clamps for grasping battery terminals may be used when a receptacle is not connected to one of the batteries.

20 Claims, 8 Drawing Sheets

(56) References Cited

U.S. PATENT DOCUMENTS

| | | | | |
|---|---|---|---|---|
| 6,803,743 | B2* | 10/2004 | George | H02J 7/0034 320/105 |
| 7,279,866 | B2* | 10/2007 | Cheung | H02J 7/0054 320/105 |
| 9,627,905 | B2 | 4/2017 | Green | |
| 2004/0066094 | A1* | 4/2004 | Suzuki | H02J 3/38 307/18 |
| 2006/0176011 | A1* | 8/2006 | Liu | H02J 7/0034 320/105 |

* cited by examiner

JUMPER CABLE

CROSS REFERENCE TO RELATED APPLICATIONS

This Application is a continuation-in-part of application Ser. No. 13/875,472, filed May 2, 2013, which claims the benefit of U.S. Provisional Application No. 61/642,546, filed May 4, 2012, the disclosures of which are fully incorporated herein by reference.

TECHNICAL FIELD

The present disclosure relates generally to jumper cables, and more specifically to a jumper cable that eliminates connection errors when charging or boosting a battery.

BACKGROUND

Typically, a driver interconnects jumper cables with a dead battery and a charged battery until the dead battery can restart the engine. Each end of the jumper cables includes a pair of clamps, one of which is fastened to either the positive or the negative terminal on one of the batteries. Although the clamps are color-coded according to polarity, they may be easily connected to the wrong terminal, which can deplete either battery and cause a short-circuit, an explosion, a blown fuse and other major electrical problems. Furthermore, the clamps are cumbersome to attach and may require the removal of terminal covers or adjacent parts.

Accordingly, there is currently a need for a device that prevents improper connection of jumper cables. The present invention addresses this need by providing a jumper cable having a uniquely-designed plug that is inserted into a mating receptacle on a battery to eliminate polarity errors when recharging a battery.

SUMMARY

The present invention relates to an improved jumper cable comprising receptacle adapted to be mounted on a battery casing or another nearby location. The receptacle includes a socket having a pair of spaced circular contacts on the inner circumference thereof that are electrically connected to a pair of battery terminals. The device also includes an interface cable having a plug at each of two opposing ends that is configured to mate with the receptacle socket. The plug includes a larger-diameter ring for engaging the upper contact and a smaller-diameter ring for engaging the lower contact when the plug is properly inserted into the socket. Accordingly, if a battery needs recharging, a plug is inserted into the receptacle socket associated with the dead battery and the opposing plug is inserted into a socket associated with a charged battery to establish electrical interconnection therebetween.

It is therefore an object of the present invention to provide a jumper cable system that eliminates polarity errors when recharging a battery.

It is another object of the present invention to provide a jumper cable system that can be quickly and easily connected to a pair of batteries.

In one embodiment, a jumper cable system for providing electricity from one battery to another may comprise a cable having two electrical conductors therethrough and having two ends. In such an embodiment, the system may further comprise two plugs, each located on an end of the cable, and each plug configured to receive an end of the cable and the conductors. Each plug may comprise an extension having two male electrical terminals electrically coupled to the corresponding two conductors, wherein the male electrical conductors each comprise conductive rings, where one of the conductive rings has a smaller diameter than the other conductive ring. Such an exemplary jumper cable system may also comprise a receptacle configured to be electrically coupled to a battery. In exemplary embodiments, the receptacle may comprise two electrical conductors electrically connected to corresponding polarity poles of the battery, as well as a socket for receiving the extension of the plug. Moreover, the receptacle may also comprise two female electrical terminals electrically connected and corresponding to the electrical conductors of the receptacle. In exemplary embodiments, the female terminals each comprise conductive rings corresponding to, and configured to engage, the conductive rings comprising the male terminals when the extension is properly inserted into the socket.

Other objects, features, and advantages of the present invention will become readily apparent from the following detailed description of the preferred embodiment when considered with the attached drawings and the appended claims.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
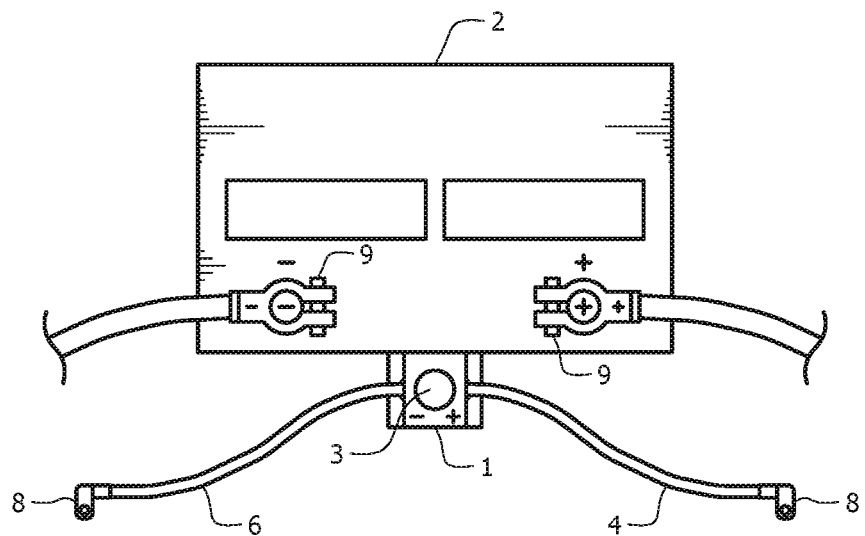
FIG. 1 illustrates a top view of one embodiment of a vehicle battery having a receptacle in accordance with the disclosed principles attached thereto.

The present disclosure relates to an improved jumper cable that eliminates connection errors when charging or boosting a battery, such as a vehicle battery. Looking first at FIG. 1, illustrated is a top view of one embodiment of a vehicle battery having a receptacle in accordance with the disclosed principles attached thereto. Specifically, in this exemplary embodiment, a receptacle in accordance with the disclosed principles 1 may be adapted to be mounted on a vehicle battery casing 2 or another nearby location. Depending on the embodiment, the receptacle 1 may be mounted on or near the battery using screws or adhesive materials, as desired. In other embodiments, the receptacle may be integrated into the battery casing 2 or even the battery itself, and thus provided from the battery manufacturer.

Figure 3:
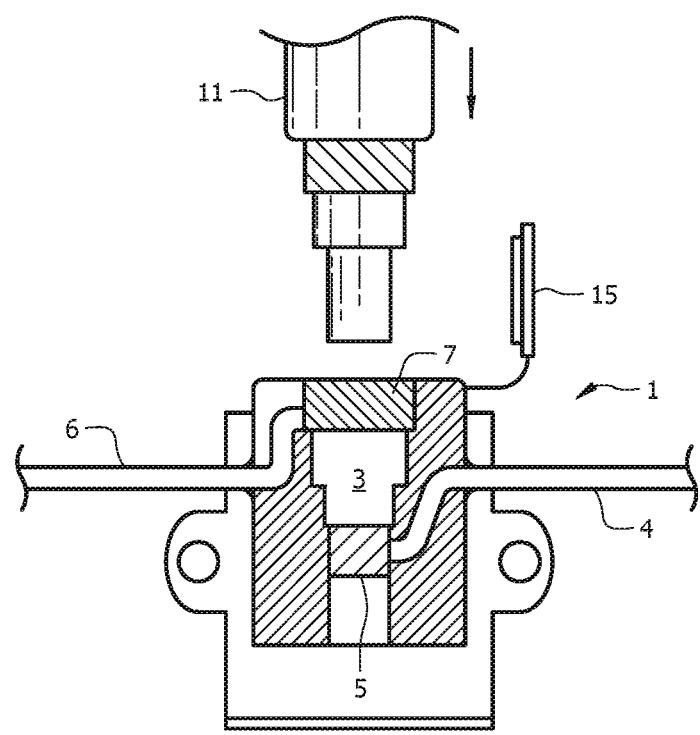
FIG. 3 illustrates a sectional view of the receptacle illustrated in FIG. 1.

The receptacle 1 in the illustrated embodiment includes a socket 3 having a pair of spaced circular contacts on the inner circumference thereof, which are shown in detail in FIG. 3. A first wire 4 extends from and is electrically connected to a lower contact 5 of the receptacle 1 on one end, and is electrically coupled to the positive terminal of the battery on its other end. Similarly, a second wire 6 extends from and is electrically connected to an upper contact 7 of the receptacle 1 on one end, and is electrically coupled to the negative battery terminal on its other end. Each wire 4, 6 preferably includes a fitting 8 that is attached to the terminal clamp bolt 9 connected to the positive and negative terminals of the battery. Of course, other techniques for electrically connecting the wires 4, 6 to the positive and negative terminals of the battery may also be employed.

Figure 2:
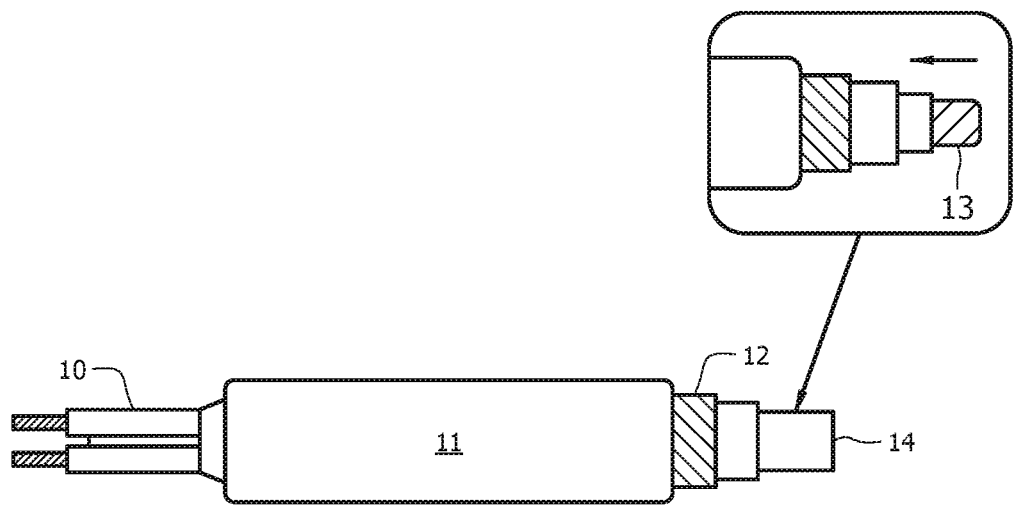
FIG. 2 illustrates a side view of one embodiment of a plug in accordance with the disclosed principles.

Turning now to FIG. 2, illustrated is a side view of one embodiment of a plug 11 in accordance with the disclosed principles. Coupled to the plug 11 and extending therefrom is an interface cable 10 for establishing electrical communication between two batteries. In exemplary embodiments, the cable 10 for use with a plug 11 in accordance with the disclosed principles includes two conductors, one for positive polarity and one for negative polarity. The arrangement of the conductors within the cable may vary depending on the embodiment. For example, in the illustrated embodiment, the conductors are positioned in a side-by-side arrangement inside the cable 10. Of course, the disclosed principle are broad enough to encompass any type of arrangement of the conductors within the cable 10, such as the coaxial arrangement disclosed in FIG. 5.

In addition, the conductors within the cable 10 may be constructed of any advantageously conductive material. For example, they may be constructed of copper, aluminum, or even gold or gold-plated if the application and conduction carried by the cable 10 calls for it. Moreover, although only two conductors are illustrated, expanded uses of the disclosed principles beyond two terminal direct current (DC) applications would encompass more than three conductors in the cable 10. For example, in three-phase alternating current (AC) electrical applications, four conductors could be included in the cable 10. In such embodiments, the disclosed principles would provide a two or three phase electrical plug that would assist in connecting three-phase electrical equipment without risk of misconnections.

As mentioned above, the cable 10 is connected to, and typically passes through at least a portion of, the plug 11. The opposing end of the plug 11 is configured to mate with the receptacle 1 socket 3 introduced above and discussed in greater detail with reference to FIG. 3. In the illustrated embodiment, the plug 11 includes a larger-diameter conductive ring 12 for electrically engaging the upper contact 7 (shown in FIG. 3) of the receptacle 1, and a smaller-diameter ring 13 for electrically engaging the lower contact 5 (also shown in FIG. 3) of the receptacle 1 whenever the plug 11 is properly inserted into the socket of the receptacle 1. The conductors of the cable 10 pass through at least a portion of the plug 11 body, and are electrically connected, respectively, to the larger- and smaller-diameter conductive rings 12, 13. The conductors of the cable 10 may be so-connected using soldering, or other type of welding, or any type of mechanical electrical connector. Also as illustrated, the plug 11 may include support for strengthening the connection of the cable 10 to the plug 11, in order to resist removal of the cable 10 from the plug 11 or the conductors within the cable 10 from the their connections with the conductive rings 12, 13.

A shroud 14 may also be included to encapsulate the smaller-diameter ring 13 in order to prevent inadvertent engagement with the upper contact 7 when the plug 11 is being inserted and removed to and from the receptacle 1. Moreover, such a shroud 14 substantially encloses the inner smaller-diameter ring 13 such that as the plug 11 is maneuvered around conductive equipment near the receptacle 1, the user will not inadvertently electrically contact the smaller-ring 13 to any other conductive equipment. Advantageously, the shroud 14 may be spring-biased so that the smaller-diameter ring 13 of the plug 11 is automatically protected as the plug 11 is removed from a receptacle 1. Additionally, the socket 3 of the receptacle 1 may be protected by a removable cap 15 that prevents debris and moisture accumulation therein when the receptacle 1 does not include the plug 11 therein.

Looking now at FIG. 3, illustrated is a sectional view of the receptacle 1 illustrated in FIG. 1 and constructed in accordance with the disclosed principles. As illustrated, the receptacle 1 includes a socket 3 for receiving a plug 11 also constructed in accordance with the disclosed principles. The removable cap 15 for covering the socket 3 opening when not in use may also be seen. In this embodiment, within the socket 3 are two electrical contacts 5, 7. Each of these contacts 5, 7 is respectively coupled to wires 4, 6, which as described above are electrically connected to the electrical terminals of the battery. As the plug 11 is properly inserted into the socket 3, the larger-diameter ring 12 will electrically contact the upper contact 7, while the smaller-diameter ring 13 will electrically contact the lower contact 5.

Figure 4:
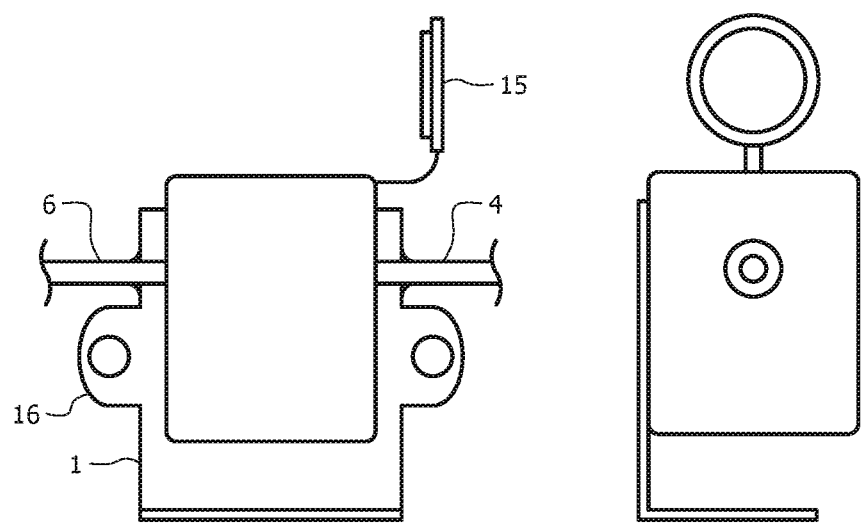
FIG. 4 illustrates front and side views of the receptacle illustrated in FIG. 3.

Referring now to FIG. 4, illustrated are front (left image) and side (right image) views of the receptacle illustrated in FIG. 3. The external views shown in FIG. 4 illustrate the first and second wires 4, 6 extending from the receptacle 1, as well as the removable cap 15 used to cover the socket 3 when not in use. Also as illustrated, the receptacle 1 may include a mounting bracket 16 for bolting (or otherwise mounting) receptacle 1 to a location preferably, but not necessarily, near the battery. For example, the receptacle 1 disclosed herein may be mounted at a location on vehicle that is distal from the battery, yet perhaps more easily accessible by user. For example, the receptacle 1 could be mounted in the cabin of a vehicle, or perhaps proximate the front bumper of the vehicle. Such mounting locations may allow use of the disclosed receptacle 1 and plug 11 without having to obtain direct access to the battery, such as in vehicles or equipment where the battery is located in an inconvenient location to access. Remote mounting may also be beneficial for vehicles or equipment needing continuous electrical connection to the battery to maintain full charge on the battery until used, such as vehicles that are rarely driven.

Figure 5:
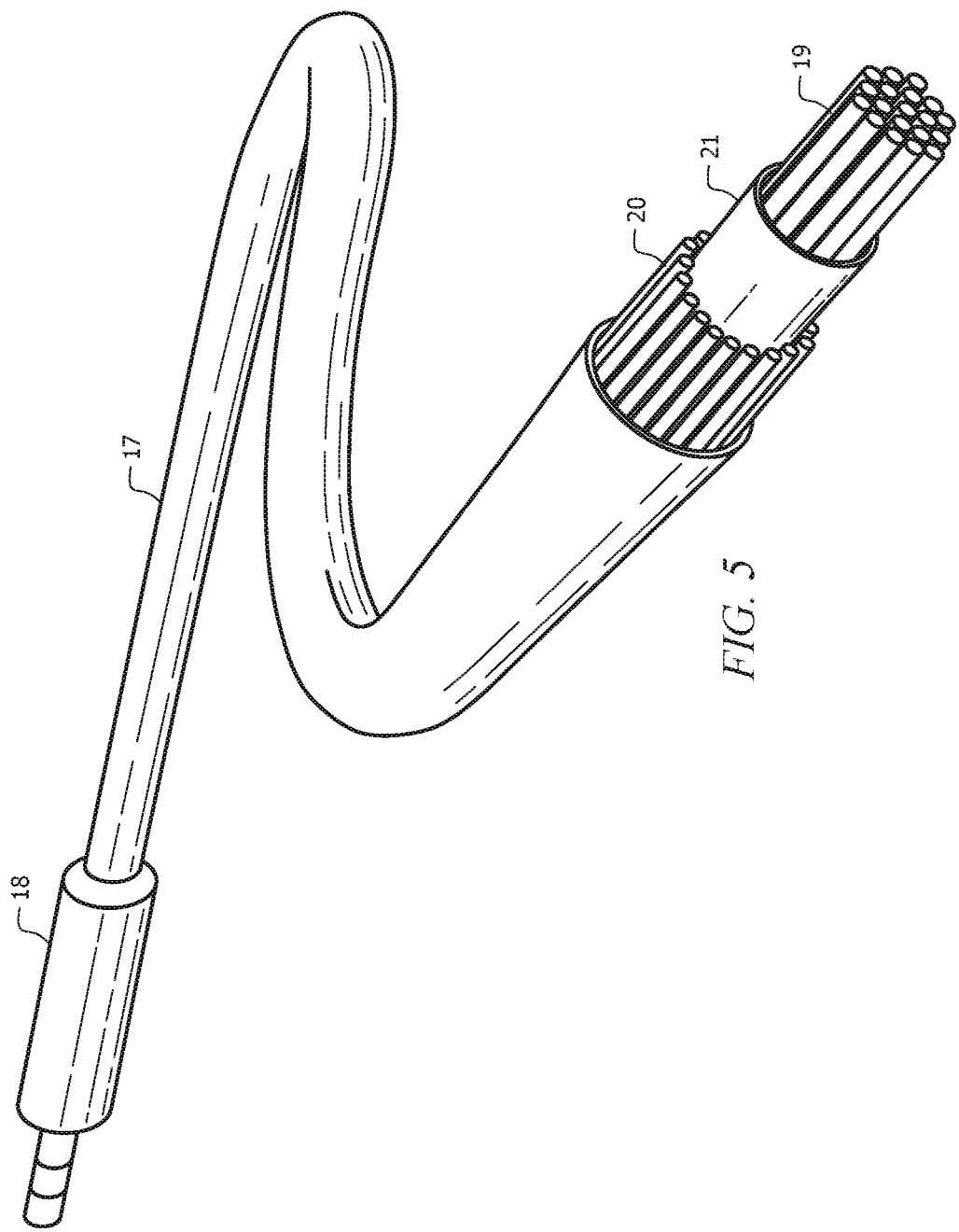
FIG. 5 illustrates an isometric view of one embodiment of a coaxial cable in accordance with the disclosed principles.

Turning now to FIG. 5, illustrated is an isometric view of one embodiment of a coaxial cable 17 constructed in accordance with the disclosed principles. In this embodiment, the coaxial cable 17 is again connected to a plug 18, which in accordance with the disclosed principles is configured to fit within a unique receptacle (not illustrated). With a coaxial configuration, the cable 17 includes an inner conductor 19 and an outer conductor 20, wherein the conductors are separated by an insulator 21. Although the conductors 19, 20 are illustrated as annular, it should be noted that one or both of the conductors may be only partially annular, and thus the outer conductor 20 would only partially encircle the inner conductor 19.

Furthermore, a coaxial cable 17 constructed in accordance with the disclosed principles may include more than two conductors 19, 20. For example, if three conductors where included in the coaxial cable 17, the resulting triaxial construction (as opposed to the biaxial construction illustrated in FIG. 5) would include a third conductor encircling both of the conductors 19, 20 illustrated in FIG. 5. Of course, as before, any number of conductors may be includes and arranged in a coaxial configuration. Moreover, in other embodiments, only some conductors within the cable could be in a coaxial arrangement, while still other conductors may be arranged alongside the coaxial conductors.

Figure 6:
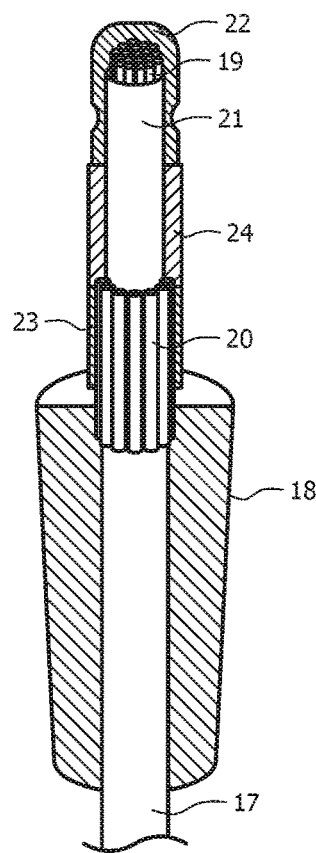
FIG. 6 illustrates a sectional view of another embodiment of a plug in accordance with the disclosed principles for use with the coaxial cable illustrated in FIG. 5.

Looking now at FIG. 6, illustrated is a sectional view of another embodiment of a plug 18 constructed in accordance with the disclosed principles. Specifically, the plug shown in FIG. 6 is configured for use with the coaxial cable 17, such as the type of coaxial cable 17 illustrated in FIG. 5. In this embodiment of a plug 18, the inner conductor 19 and outer conductor 20 of the coaxial cable 17 may be seen extending through the body of the plug 18. In addition, the inner conductor 19 is configured to electrically connect to a first terminal 22 of the plug 18, while the outer conductor 20 is configured to electrically connect to a second terminal 23 of the plug. An insulator 24 may separate the first and second terminals 22, 23 from each other, as well. As in other embodiments, the conductors 19, 20 may be electrically coupled to the first and second terminals 22, 23 using any of a number of techniques, including welding and mechanically-based electrical couplers.

Figure 7:
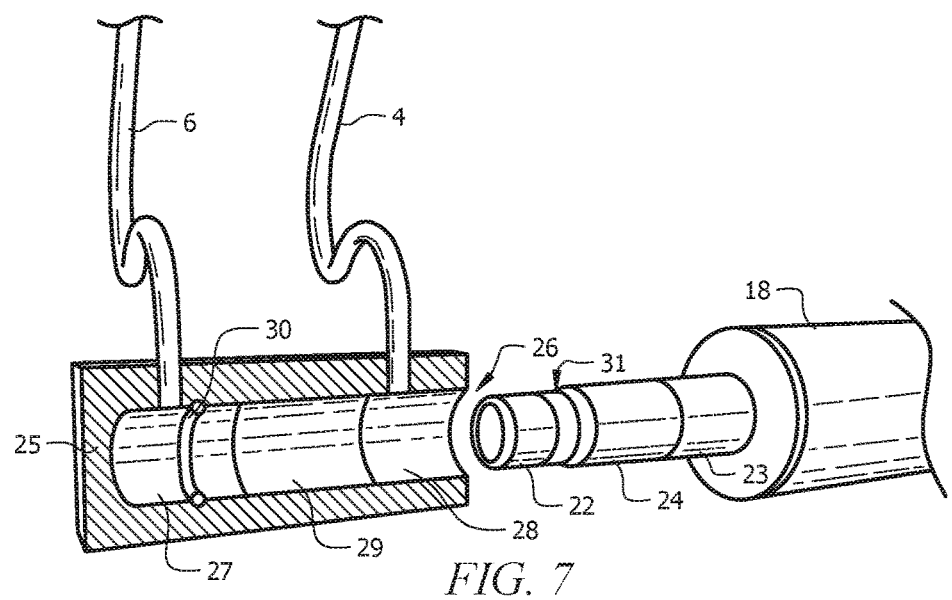
FIG. 7 illustrates a perspective view of one embodiment of a receptacle in accordance with the disclosed principles and configured for receiving the plug illustrated in FIG. 6.

Turning to FIG. 7, illustrated is a perspective, partially sectional view of another embodiment of a receptacle 25 in accordance with the disclosed principles and configured for receiving the plug 18 illustrated in FIG. 6. This embodiment of a receptacle 25 constructed in accordance with the disclosed principles again includes wires 4, 6 configured to be electrically connected to the corresponding terminals of a battery. Also as before, the receptacle 25 may be located near the battery to which it is connected, or may be mounted at a remote location.

To receive the plug 18 having the coaxial cable 17, the receptacle 25 includes a socket 26 on one end. Once the extending prong of the plug 18 is inserted into the socket 26, an inner ring 27 is configured to electrically connect with the first terminal 22 of the plug 18, while an outer ring 28 is configured to electrically connect with the second terminal 23 of the plug 18. As illustrated, an insulating ring 29 may also be disposed between the inner and outer rings 27, 28 to electrically isolate the rings 27, 28 from one another. Furthermore, the socket 26 may also include a securing ring 30 therein. The securing ring 30 may be included to help retain the extension portion of the plug 18 within the receptacle 25. Therefore, the plug 18 may include an annular notch 31 corresponding to the location of the securing ring 30 to resist removal of the plug 18 from the socket 26 once the two are properly engaged.

In operation, a jumper cable having a plug and receptacle in accordance with the disclosed principles is attached to each of two batteries. Specifically, the plugs on the ends of the cable are inserted into the receptacles electrically connected to the corresponding batteries in order to provide electrical charge to one of the batteries. Once the dead battery has been sufficiently replenished, the plugs are withdrawn from their corresponding receptacles and the cable may be stored until needed again. Those who are skilled in the art will understand that the above-described devices and related techniques are not limited to the exact details of construction and enumeration of parts provided herein. Furthermore, the size, shape and materials of construction of the various components can be varied. Additionally, in the event that both vehicles are not equipped with a receptacle as disclosed herein, the disclosed principles also provide for a set of battery terminal clamps having their own receptacle. As a result, one end of a cable as disclosed herein may be inserted into the receptacle that is electrically connected to the set of clamps, and then the clamps electrically connected to the electrical/battery terminals of the vehicle or equipment not having an installed receptacle. The clamps may then be used to provide the electrical connection to that vehicle or equipment in the traditional manner, while the plug and receptacle on the other vehicle or equipment are employed as disclosed herein.

Figure 8:
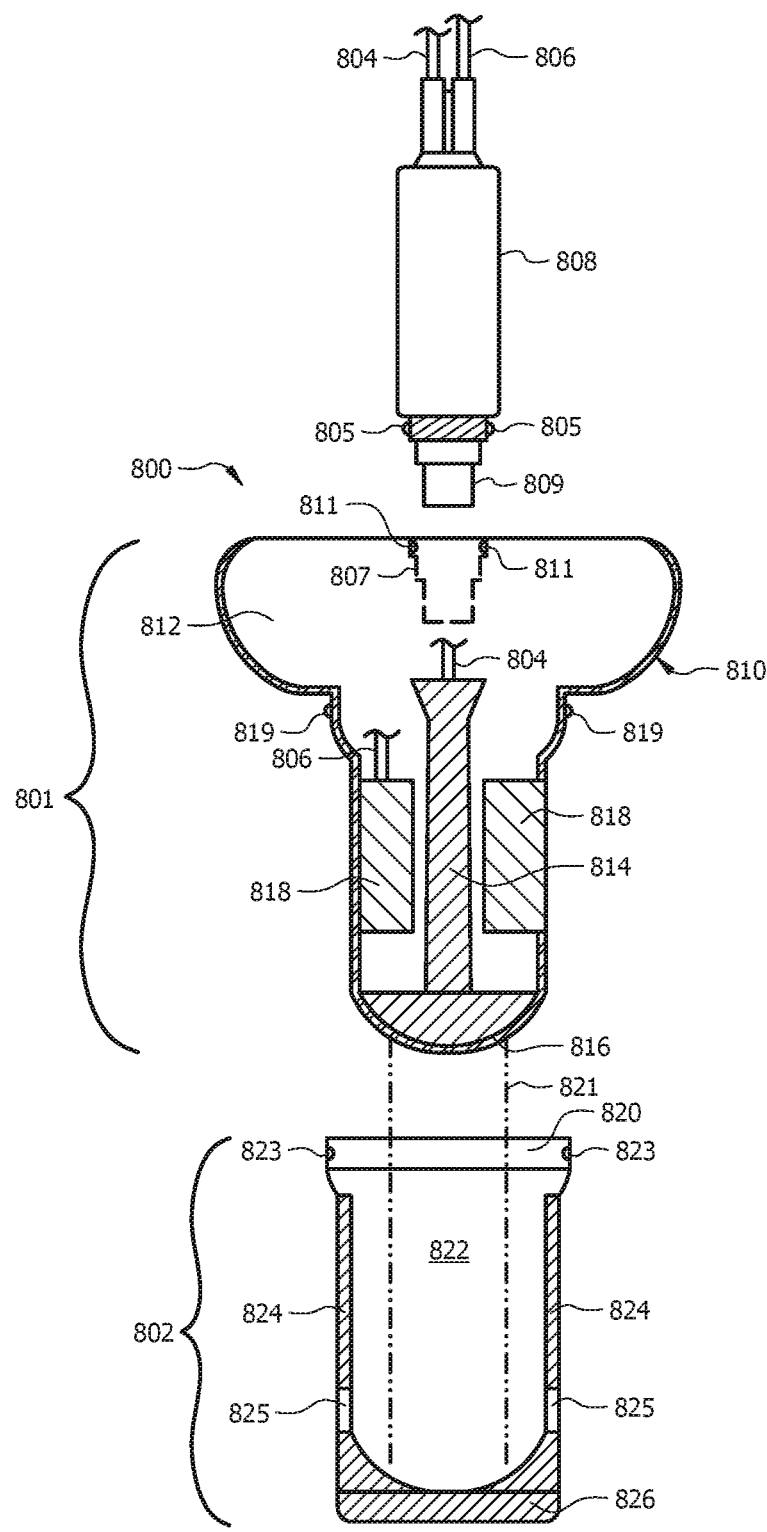
FIG. 8 illustrates a section view of an embodiment of a plug or adaptor plug.
Figure 9:
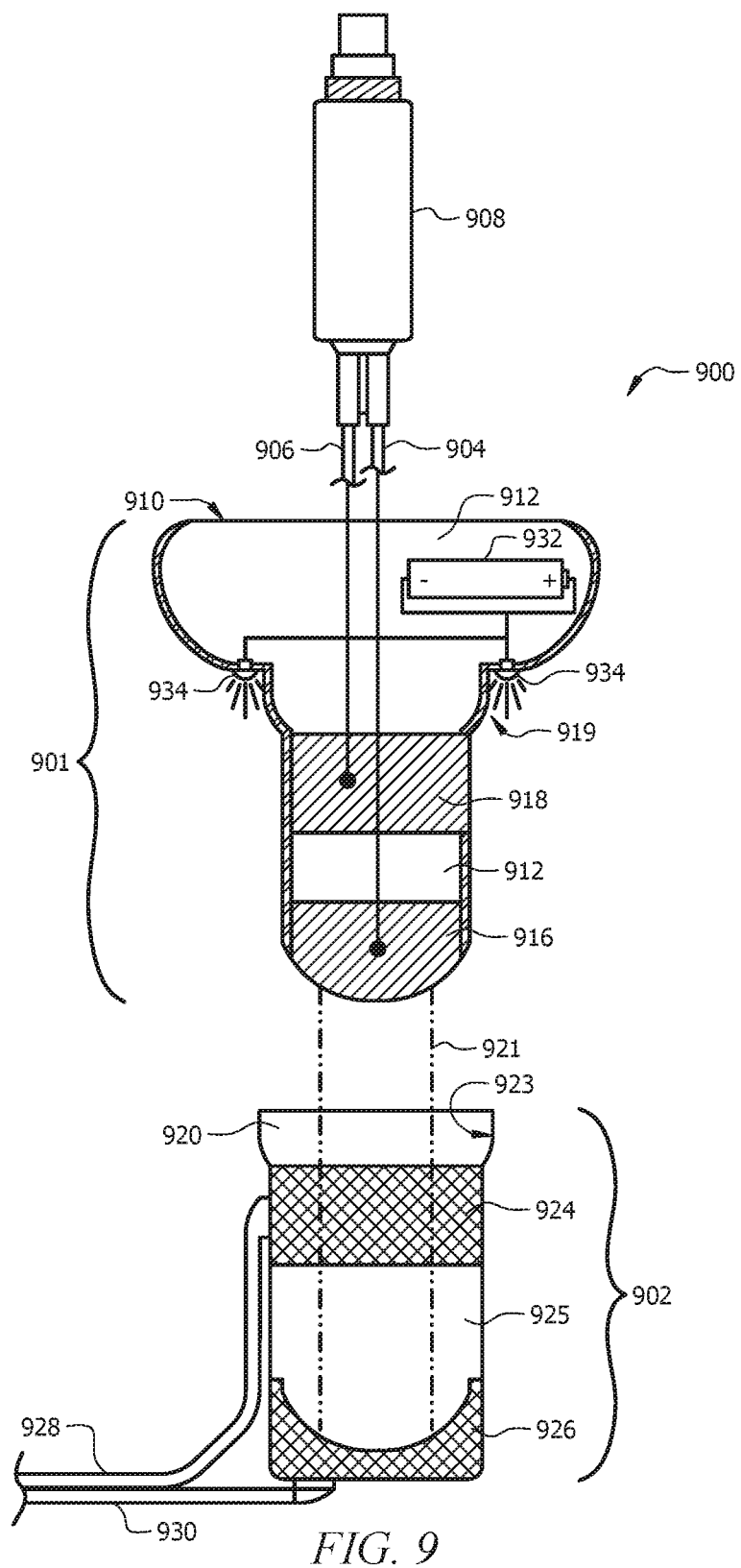
FIG. 9 illustrates a sectional view of an alternative embodiments of a plug or adaptor plug.

Moving to FIG. 8, illustrated is an alternative embodiment of an adaptor plug and receptacle unit 800. Connections from the adaptor plug 801 to a plug 808 as shown, or to wires 804 and 806 as shown in FIG. 9, allow the adaptor plug 801 to be connected to a battery or other wired connection for the transfer of electrical energy and power. The plug 808 can also be locked in to the adaptor plug via a locking ring or nipple 805, and a locking channel 811. The locking ring or nipple 805 and the locking channel 811 can operate similar to that illustrated in FIG. 10. In one embodiment of the present invention, in a locking nipple configuration, the locking nipple 805 can be rotated and twisted into a locked position via the locking channel 811. In another embodiment of the present invention, in a locking ring configuration, the locking ring 805 can be snapped into the locking channel 811 securing the plug 808 into the adaptor plug 801. The adaptor plug 801 is capable of sliding 821 and locking within a receptacle 802. The receptacle 802 connects to a battery or other wired connection for the transfer of electrical energy and power. It would be understood that wires such as those shown as 804 and 806, could have, but are not limited to single, multiple, or coaxial conductors.

The plug 808 can connect the conductive rings 809 through a sliding connection to the socket 807 along to the upper portion of the adaptor plug 801. The plug 808 and adaptor plug 801 allow for multiple styles of wired connections to interact and interconnect. Much in the same way that different manufactures of vehicles have different designs for various components, different car manufactures may desire a different connection design to accommodate various designs. For example, a compact car would more likely desire a smaller connection such as, but not limited to, plug 808, while a full size vehicle or sport utility vehicle ("SUV") could utilize an adaptor plug 801 to convert the size of plug 808 or a direct wired connection adaptor plug as shown in FIG. 9.

The adaptor plug 801 is comprised of an outer shell 810 surrounding insulation 812. It would be understood that the insulation 812 and later 825 could be similar or dissimilar insulating materials, capable of preventing connection or arcing between two conductors. The design material of the outer shell 810 can be plastic or rigid materials. Along the lower shoulder of the adaptor plug 801 there is at least one locking nipple or ring 819 that allows the adaptor plug 801 to lock within the receptacle 802. The insulation 812 can be any material that can act as an insulator between the first electrical connection, conductive ring, or the sleeve 818, and the second electrical connection point, conductive ring, or the support member 814 and terminal tip 816. The sleeve 818 can be understood by those in the art to wrap around the outer edge of the outer shell 810 with connections through the outer shell 810. In alternative embodiments of the present invention the sleeve 818 can be weaved outside of the outer shell 810 at specific points so that the sleeve 818 comprises 25% of outer shell circumference. In other embodiments of the present invention, the sleeve 818 comprises 50% of the outer shell circumference, and still in other embodiments, the sleeve 818 comprises 75% of the outer shell circumference. The support member 814 and the terminal tip 816 allow for a second electrical connection. The terminal tip 816 rests just inside the opening of the outer shell 810, in order to prevent the terminal tip 816 from accidentally encountering the wrong electrical connection point on the receptacle 802.

The receptacle 802 has an internal structure 822 sized and designed to receive the adaptor plug 801. The receptacle 802 has an opening and locking edge 820 that will allow the device to receive the adaptor plug 801, as well as conform, and lock the adaptor plug 801 with the receptacle 802. The locking edge or ridge 820 also has a locking channel 823 that corresponds to the locking nipple or ring 819. The locking edge or ridge 820 would allow the adaptor plug and receptacle to not be easily removed or separated from each other via the locking nipple or ring 819 and locking channel 823 during a jumping process. The locking channel 823 and locking nipple or ring 819 could appear like the point and socket illustrated in FIG. 10. Within the receptacle 802 there are two electrical connection points, the receptacle sleeve 824 and the tip base 826, an insulator 825 separates these two areas.

The receptacle sleeve 824 is made of an electrically conductive material that connects the receptacle sleeve 824 via a wired connection to other receptacles, electrical components, or batteries. Additionally, the receptacle sleeve 824 corresponds to the sleeve 818 along the adaptor plug 801. When the adaptor plug 801 and the receptacle 802 are slidably connected 821 and locked together the sleeve 818 and receptacle sleeve 824 allow for the transfer of power and energy via the electrical connection. Similarly, the tip base 826 also is made of an electrically conductive material that connects the tip base 826 via a wired connection to other receptacles, electrical components, or batteries. Furthermore, the terminal tip 816 of the adaptor plug 801 corresponds to the tip base 826 of the receptacle 802. When the adaptor plug 801 and the receptacle 802 are slidably connected and locked together the terminal tip 816 and tip base 826 allow for the transfer of power and energy via the electrical connection. The insulator material comprises any material that will prevent or materially inhibit an electrical connection between the tip base 826 and the receptacle sleeve 824.

Referring now to FIG. 9, which illustrates an alternative embodiment of an adaptor plug and receptacle wiring connection 900. The adaptor plug 901 as shown is a male connector that corresponds to the receptacle 902 that as shown is a female connector. The adaptor plug 901 and the receptacle 902 are capable of a sliding connection 921 that can lock via bumps or ridges along the outer shell 910 of the adaptor plug 901. The locking connection could be made through a locking nipple or ring 919 along the shoulder of the adaptor plug 901, and a locking channel 923 long the locking opening or ridge 920. The locking channel 923 and locking nipple or ring 919 could appear like the point and socket illustrated in FIG. 10. Much like FIG. 8, the adaptor plug 901 can be a wired connection as shown via the wires 904 and 906, allowing there to be a direct connection to a battery (not shown) or to allow for a connection to an additional plug 908. It would be understood that wires such as those shown as 904 and 906, could have, but are not limited to single, multiple, or coaxial conductors. Alternatively, a similar system as employed in FIG. 8, where in the adaptor plug 901 is capable of receiving and/or locking an additional plug 908, within the upper portion of the outer shell 910 of the adaptor plug 901, along wire 904 and 906 to connect to 918 and 916 (as defined below) via the plug 908.

The wires 904 and 906 respectively correspond to a first electrical connection point or sleeve 918 and a second electrical connection point or terminal tip 916. It would be understood that the sleeve 918 could wrap around the entire circumference of the outer shell 910 of the adaptor plug 901 and have one or more connection points through the outer shell 910 or the sleeve 918 could also connect two sections of the outer shell 910. The sleeve would have a height corresponding to the size of the adaptor plug 901 and the corresponding electrical connection point within the receptacle 902. To prevent a short or other form of arcing or other unplanned electrical connections, an insulator 912 can be utilized. The insulator 912 would protect the small cell battery 932 from interfering or connecting to the sleeve 918. A small cell battery could be any form of button battery, AAA, AA, C, D, or 9V batteries as well as other batteries with the same or similar characteristics.

The terminal tip 916 is separated from the sleeve 918 by an insulator 912. The terminal tip 916 is also recessed slightly within the lower portion of the outer shell 910, in order to prevent the terminal tip 916 from shorting or arcing to undesired electrical connection points within the receptacle 902 during a sliding and locking connection.

The upper lip 920 of the receptacle 902 allows for a locking connection the corresponding shoulder of the adaptor plug 901. The first receptacle electrical connection point or the receptacle sleeve 924, allows the receptacle 902 to provide an electrical connection to an electrical component such as a battery (not shown) or other electrical device via the receptacle sleeve wire 928. The receptacle sleeve 924 also corresponds to the sleeve 918 of the adaptor plug 901, and thus when slidably connected the sleeve 918 and the receptacle sleeve 924 make an electrical connection passing electrical energy and power from the adaptor plug 901 to the receptacle 902.

The tip base 926 corresponds to the terminal tip 916 and allows the receptacle 902 to provide an electrical connection to an electrical component such as a battery (not shown) or other electrical device via the tip base wire 930 when the adaptor plug 901 and receptacle 902 are slidably connected. The receptacle sleeve 924 and the tip base 926 are separated by an insulator 925 to prevent any shorting or arcing to undesired electrical connection points within the receptacle 902 during a sliding and locking connection.

Figure 10:
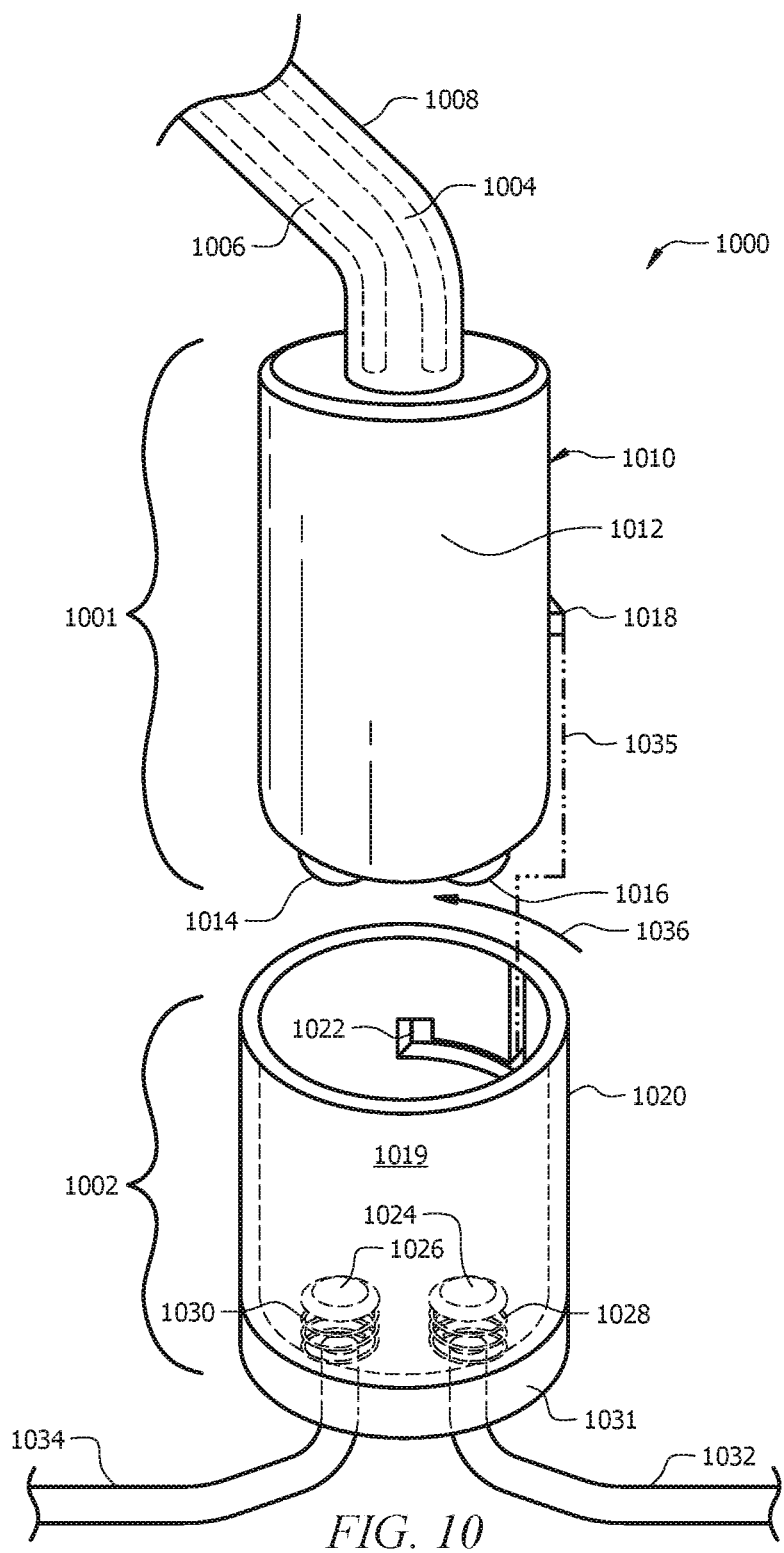
FIG. 10 illustrates a perspective view of an alternative embodiment of a plug or adaptor plug.

Now turning to FIG. 10, a button and spring connection adaptor plug and receptacle 1000 is shown. The adaptor plug 1001 has an outer shell 1010 that can be filled with an insulator 1012 or left hollow with only the wired connections to the buttons 1014 and 1016. The wired connection 1008 can correspond to two wires 1004 and 1006 that connect to the terminal button contacts 1014 and 1016. The wired connection 1008 could also correspond to a plug connection like that illustrated in FIG. 8.

The adaptor plug 1001 is slidable 1035, rotatable 1036, and lockable via the point 1018 and socket 1022. A void 1019 within the receptacle 1002 allows the circumference of the adaptor plug 1001 to slide within the void 1019 and connect the adaptor plug 1001 and receptacle 1002. The point 1018 is sized such that it is less than the outer wall 1020 of the receptacle 1002, such that there is still some amount of the outer wall 1020 of the receptacle 1002 beyond the groove.

The terminal button contact pads 1024 and 1026 correspond to the terminal button contacts 1014 and 1016 of the adaptor plug 1001. When the adaptor plug 1001 is locked with the receptacle 1002, the terminal button contact pads 1024 and 1026 are aligned with and pushed towards the terminal button contacts 1014 and 1016 on the adaptor plug 1001, via the terminal button contact pad springs 1030 and 1028 that are placed along the bottom surface 1031 of the receptacle 1002. The wires 1032 and 1034 that allow an electrical connection to be provided to electrical elements, can attach to the terminal button contact pads 1024 and 1026, and/or the terminal button contact pad springs 1028 and 1030.

Figure 11:
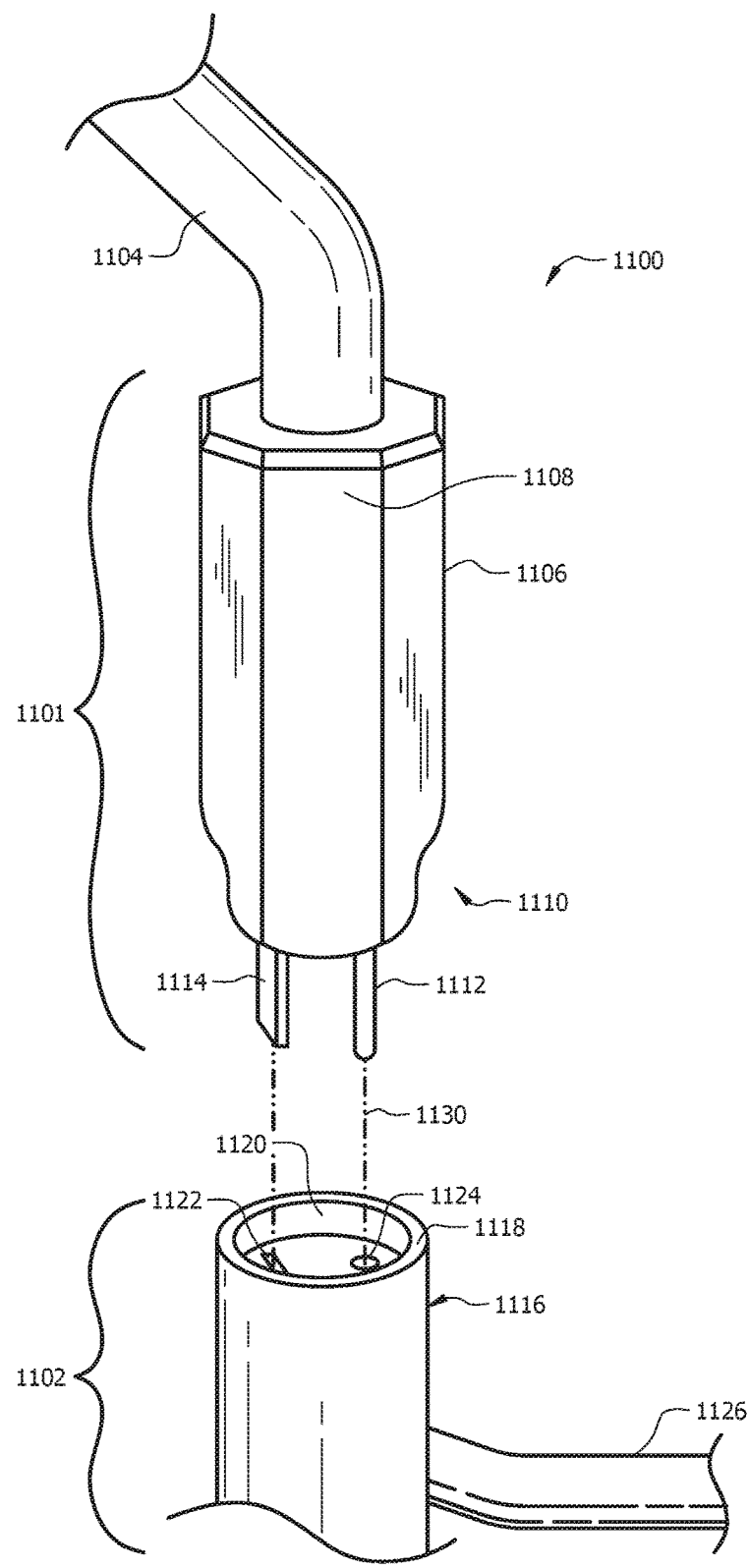
FIG. 11 illustrates a perspective view of an alternative embodiment of a plug or adaptor plug.

Turning to FIG. 11, a blade and pin adaptor plug and receptacle 1100 is shown. The adaptor plug 1101 has a wired connection 1104 that can be directly connected or connected through a plug like connection as seen in FIG. 8. The outer surface 1106 of the adaptor plug 1101 can be filled with an insulator 1108 material or can just have the wires corresponding to the wired connection 1104. The wired connection 1104 allows electrical energy and power to be transferred to the blade 1114 and pin 1112. The blade 1114 and pin 1112 correspond to the blade socket 1122 and pin socket 1124 of the receptacle 1102. The said sockets are connected via wires to the wired connection 1126.

The outer surface 1106 of the adaptor plug 1101 has a shoulder 1110 that corresponds to the recessed section 1120 of the receptacle 1102. The receptacle outer surface wall 1118 can slide around the reduced section of the adaptor plug 1101 that corresponds to the shoulder 1110 when the adaptor plug 1101 and the receptacle 1102 are slid together 1130. Much like the adaptor plug 1101, the receptacle 1102 can be filled with an insulator material or can be hollow with the wires enclosed. The wires for the receptacle can be connected with the wired connection 1126 that allows for multiple wired connections to be enclosed within one wire housing 1126.

While various embodiments in accordance with the principles disclosed herein have been described above, it should be understood that they have been presented by way of example only, and not limitation. Thus, it will be readily apparent to those skilled in the art that modifications may be made thereto which still fall within the breadth and scope of this disclosure, which is defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

I claim:

1. A system for providing electricity from one battery to another, the system comprising:
    a cable having a plurality of electrical conductors therethrough and having at least two opposing ends;
    at least one plug located on one of the opposing ends of the cable, the plug configured to receive one of the opposing ends of the cable and said conductors, and the plug comprising an male extension having a plurality of plug electrical terminals coupled to said electrical conductors of the cable;
    wherein the plurality of plug electrical terminals are set a fixed distance apart from each other and at least one of the plug electrical terminals is located at a terminal tip of the male extension;
    a receptacle configured to be electrically coupled to a battery, the receptacle comprising:
    a female socket for receiving the male extension of the plug;
    a plurality of receptacle electrical terminals coupled to said electrical conductors;
    wherein the plurality of receptacle electrical terminals are set a fixed distance apart from each other and at least one of the receptacle electrical terminals is located at a proximal end of the receptacle terminating into the base of the receptacle; and
    wherein said receptacle electrical terminals are electrically connected to corresponding polarity poles of the battery.

2. The system according to claim 1, wherein said plug electrical terminals are configured as electrically conductive rings, a first conductive ring distal from the extension from a body of the plug, and a second conductive ring located at a proximal end of the extension terminating into the body of the plug.

3. The system according to claim 1, wherein said receptacle electrical terminals are configured as electrically conductive rings, a first conductive ring distal from a base of the receptacle, and a second conductive ring located at a proximal end of the receptacle terminating into the base of the receptacle.

4. The system according to claim 1, wherein said plug electrical terminals are configured as at least two electrically conductive button contacts, said button contacts are set a fixed distance from each other within a diameter of the extension.

5. The system according to claim 1, wherein said receptacle electrical terminals are configured as spring loaded electrically conductive button contacts, said button contacts are set a fixed distance from each other within a diameter of a base of the receptacle.

6. The system according to claim 1, wherein said plug electrical terminals are configured as at least two pin contacts, said pin contacts are set a fixed distance from each other within a diameter of the extension.

7. The system according to claim 1, wherein said receptacle electrical terminals are configured as at least two pin contact sockets, said pin contact sockets are set a fixed distance from each other within a diameter of a base of the receptacle.

8. The system according to claim 1, wherein said plug further comprises:
   at least one battery; and
   at least one light emitting device.

9. The system according to claim 1, wherein said plug further comprises a plug locking member along an outer circumference of the extension.

10. The system according to claim 9, wherein said receptacle further comprises:
    a groove configured to accept the plug locking member; and
    a locking socket rotatably offset from the groove.

11. A system for providing electricity from one battery to another, the system comprising:
    a cable having a plurality of electrical conductors therethrough and having at least two opposing ends;
    at least one plug located on one of the opposing ends of the cable, the plug configured to receive one of the opposing ends of the cable and the conductors, and the plug comprising an male extension having a plurality of plug electrical terminals coupled to said electrical conductors of the cable;
    at least one adaptor plug configured with a female adaptor plug socket to receive said male extension of the plug, and a plurality of adaptor plug socket electrical terminals for connecting to the plurality of plug electrical terminals, and the adaptor plug comprising an male extension having a plurality of adaptor plug electrical terminals;
    wherein the plurality of plug or adaptor plug electrical terminals are set a fixed distance apart from each other and at least one of the plug or adaptor plug electrical terminals is located at a terminal tip of the male extension;
    a receptacle configured to be electrically coupled to a battery, the receptacle comprising:
    a female socket for receiving the male extension of said plug or adaptor plug;
    a plurality of receptacle electrical terminals coupled to said electrical conductors;
    wherein the plurality of receptacle electrical terminals are set a fixed distance apart from each other and at least one of the receptacle electrical terminals is located at a proximal end of the receptacle terminating into the base of the receptacle; and
    wherein the receptacle electrical terminals are electrically connected to corresponding polarity poles of the battery.

12. The system according to claim 11, wherein said plug or adaptor plug electrical terminals are configured as electrically conductive rings, a first conductive ring distal from the extension from a body of the plug or adaptor plug, and a second conductive ring located at a proximal end of the extension terminating into the body of the plug or adaptor plug.

13. The system according to claim 11, wherein said receptacle electrical terminals are configured as electrically conductive rings, a first conductive ring distal from a base of the receptacle, and a second conductive ring located at a proximal end of the receptacle terminating into the base of the receptacle.

14. The system according to claim 11, wherein said plug or adaptor plug electrical terminals are configured as at least two electrically conductive button contacts, said button contacts are set a fixed distance from each other within a diameter of the extension.

15. The system according to claim 11, wherein said receptacle electrical terminals are configured as spring loaded electrically conductive button contacts, said button contacts are set a fixed distance from each other within a diameter of a base of the receptacle.

16. The system according to claim 11, wherein said plug or adaptor plug electrical terminals are configured as at least two pin contacts, said pin contacts are set a fixed distance from each other within a diameter of the extension.

17. The system according to claim 11, wherein said receptacle electrical terminals are configured as at least two pin contact sockets, said pin contact sockets are set a fixed distance from each other within a diameter of a base of the receptacle.

18. The system according to claim 11, wherein said plug or adaptor plug further comprises:
    at least one battery; and
    at least one light emitting device.

19. The system according to claim 11, wherein said plug further comprises a plug or adaptor plug locking member along an outer circumference of the extension.

20. The system according to claim 19, wherein said receptacle further comprises:
    a groove configured to accept the plug or adaptor plug locking member; and
    a locking socket rotatably offset from the groove.

* * * * *